United States Patent [19]

von Bieren et al.

[11] Patent Number: 5,201,015
[45] Date of Patent: Apr. 6, 1993

[54] CONFORMAL FIBER OPTIC STRAIN SENSOR

[75] Inventors: Karlheinz von Bieren, Camarillo; Akbar Arabsadeghabadi, Simi Valley; Phillip Skochinski, Woodland Hills, all of Calif.

[73] Assignee: Litton Systems, Inc., Beverly Hills, Calif.

[21] Appl. No.: 762,311

[22] Filed: Sep. 19, 1991

[51] Int. Cl.$^5$ .............................................. G02B 6/02
[52] U.S. Cl. ...................................... 385/13; 356/345
[58] Field of Search .................... 385/12, 13; 356/345, 356/352

[56] References Cited

U.S. PATENT DOCUMENTS

| | | | |
|---|---|---|---|
| 4,294,513 | 10/1981 | Nelson et al. | 350/96.29 |
| 4,368,981 | 1/1983 | Ozeki | 356/352 |
| 4,418,981 | 12/1983 | Stowe | 385/12 |
| 4,525,818 | 6/1985 | Cielo et al. | 367/149 |
| 4,545,253 | 10/1985 | Avicola | 73/655 |
| 4,632,551 | 12/1986 | Pavlath | 356/345 |
| 4,648,083 | 3/1987 | Giallorenzi | 367/149 |
| 4,725,124 | 2/1988 | Taylor | 385/4 |
| 4,848,906 | 7/1989 | Layton | 356/345 |
| 4,904,863 | 2/1990 | McDearmon | 385/12 |
| 4,915,468 | 4/1990 | Kim et al. | 350/96.15 |
| 5,064,270 | 11/1991 | Turpin et al. | 385/28 |

FOREIGN PATENT DOCUMENTS

WO79/00377 6/1979 PCT Int'l Appl. .

OTHER PUBLICATIONS

Blake et al., *Optics Letters*, vol. 11, No. 3, Mar. 1986, "Fiber-optic modal coupler using periodic microbending", pp. 177–179.

Dandridge et al., "Phase Compensation in Interferometric Fiber-optic Sensors", *Optics Letters*, Jun. 1982, vol. 7, No. 6, pp. 279–281.

Duncan, "Modal Domain Sensing," *Modal Interference Techniques for Strain Detection in Few-Mode Optical Fibers*, Master in Science in EE Thesis, Apr. 1988, Blacksburg, Va. pp. 34–70.

Goedgebuer et al., "Multiplex Communication Via Electro-Optic Modulation of White Light," *Optica Acta*, 1982, vol. 29, No. 4, 471–477.

Goedgebuer et al., "Electrooptic Modulation of Multilongitudinal Mode Laser Diodes: Demonstration at 850 nm with Simultaneous Data Transmission by Coherence Multiplexing," *IEEE J. Quantum Electron.*, Jul. 1987, vol. QE-23, No. 7, pp. 1135–1144.

Goedgebuer et al., "Coherence Multiplexing Using a Parallel Array of Electrooptic Modulators and Multimode Semiconductor Lasers," *IEEE J. Quantum Electron.*, Jul. 1987, vol. QE-23, No. 12, pp. 2224–2237.

Huang et al., "Perturbation Effects on Mode Propagation in Highly Elliptical Core Two-Mode Fibers," *Journal of Lightwave Technology*, vol. 8, No. 1, Jan. 1990.

Kersey et al., "Phase Noise Reduction in Coherence Multiplexed Interferometric Fiber Sensors," *Electronics Letters*, May 22, 1986, vol. 22, No. 11.

Kim et al., "Use of Highly Elliptical Core Fibers for Two-mode Fiber Devices," *Optics Letters*, Sep. 1987, vol. 12, p. 729.

Kim et al., "Multiplexing of Fiber-optic Sensors," *Optics News*, Nov. 1989, pp. 35–42.

Wentworth et al., "Expected Noise Levels for Interferometric Sensors Multiplexed Using Partially Coherent Light," *SPIE*, 1985, vol. 566, Fiber Optic and Laser Sensors III, pp. 212–217.

Wood, "Increased Power Injection in Multimode Optical-Fiber Buses Through Mode-Selective Coupling," *Journal of Lightwave Technology*, vol. LT-3, No. 3, Jun., 1985.

*Primary Examiner*—Frank Gonzalez
*Attorney, Agent, or Firm*—Lynn & Lynn

[57] ABSTRACT

A length of optical fiber is attached to a flexible base plate at two spaced apart locations. The portion of the fiber between the two points of connection is under a bias tension. An interferometer is formed in the tensioned portion of the optical fiber. The sensor is mounted to a surface and changes in interference patterns output by the interferometer are monitored to measure strain in the surface.

7 Claims, 1 Drawing Sheet

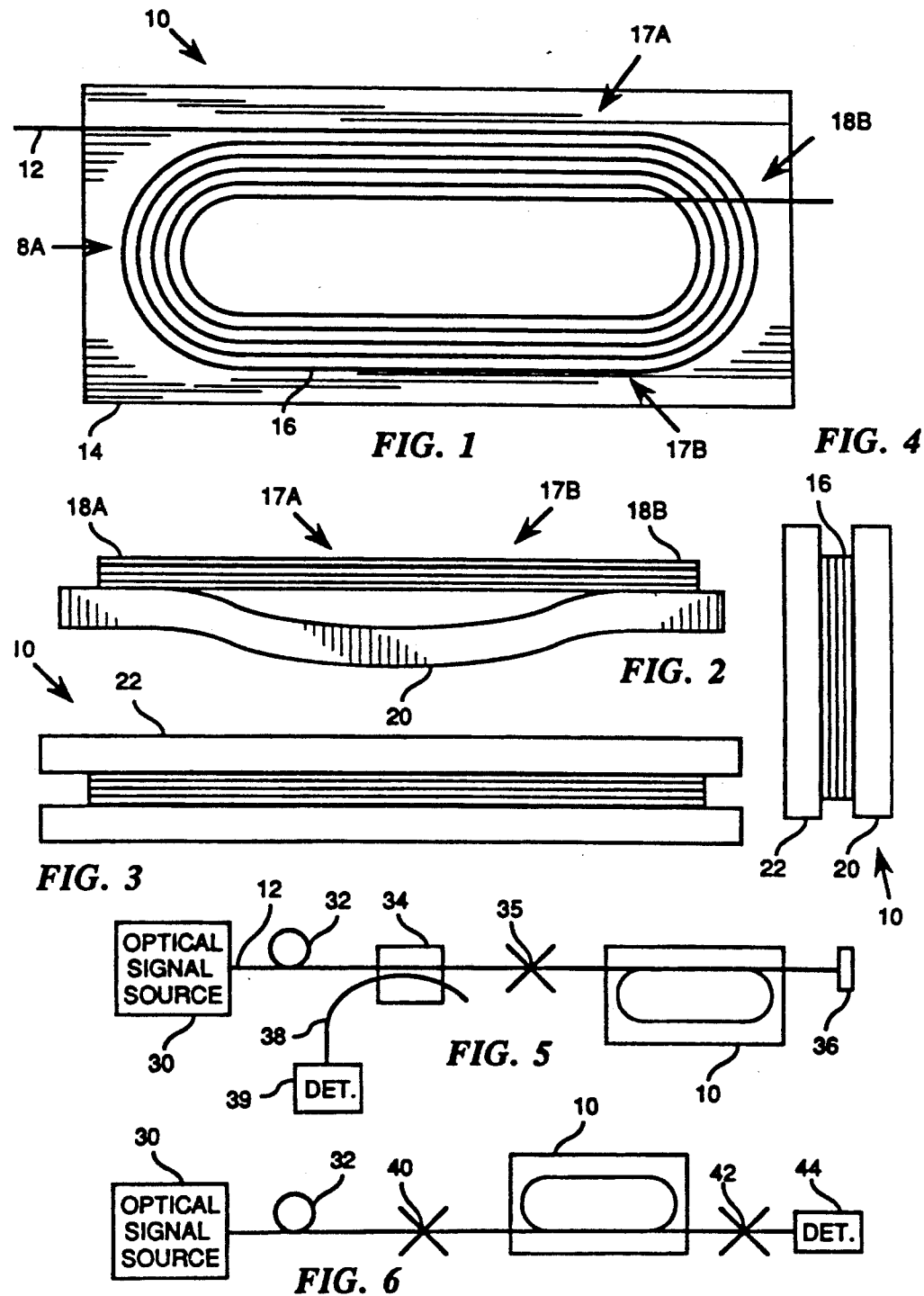

CONFORMAL FIBER OPTIC STRAIN SENSOR

BACKGROUND OF THE INVENTION

This invention relates generally to apparatus and methods for measuring strain. More particularly, this invention relates to measuring strain along a curved surface. Still more particularly, this invention relates to a strain sensor having a flexible fiber optic sensing element.

Fiber optic sensors have a wide variety of applications for sensing parameters such as temperature, pressure, strain, acoustic waves, electromagnetic waves and rotation. Strain in an optical fiber produces an optical path length change by physically changing the length of the fiber and by changing its index of refraction by means of the photoelastic effect. A number of parameters may be measured when the optical fiber is mounted in a transducer that produces a strain in the fiber when the parameter of interest changes.

The most sensitive fiber optic sensors detect changes in a parameter of interest by monitoring interference between two signals. One or both of the optical signals are exposed to the parameter. The signals have different optical paths and experience a relative phase change as the parameter changes. Commonly used interferometric sensors include Mach-Zehnder, Michelson, Fabry-Perot, ring resonator, polarimetric and two-mode fiber interferometers. Most of these sensors have two separate fibers that form sensing and reference arms. A length of a single fiber may function as an interferometer if it guides two modes that exhibit different responses to changes in the parameter being measured.

SUMMARY OF THE INVENTION

A fiber optic strain sensor according to the present invention for measuring strains along a curved surface, comprises a flexible base plate and a length of optical fiber attached to the base plate at two spaced apart locations. A sensing portion of the optical fiber is then located between the two spaced apart locations. The strain sensor further includes means for applying a bias tension to the sensing portion of the optical fiber and means for forming an interferometer in the sensing portion of the optical fiber.

A method according to the present invention for forming a fiber optic strain sensor comprises the steps of providing a flexible base plate and attaching a length of optical fiber to the base plate at two spaced apart locations with a sensing portion of the optical fiber being between the two spaced apart locations. The method further includes the steps of applying a bias tension to the sensing portion of the optical fiber; and forming an interferometer in the sensing portion of the optical fiber.

The step of applying a bias tension to the sensing portion of the optical fiber may comprise the steps of bending a central portion of the base plate, fixing the optical fiber to the base plate with the two spaced apart locations being on opposite sides of the central portion and straightening the base plate so that the portion of the optical fiber that is between the two spaced apart locations is under tension.

BRIEF DESCRIPTION OF THE DRAWINGS

FIG. 1 is a plan view showing a coil of optical fiber attached to a base plate to form a fiber optic strain sensor according to the present invention;

FIG. 2 is a side elevation view of a base plate and a fiber optic coil showing how the coil may be attached to the base plate to provide a bias tension to the fiber;

FIG. 3 is a side elevation view of a fiber optic strain sensor according to the present invention;

FIG. 4 end elevation view of the fiber optic strain sensor of FIG. 3;

FIG. 5 schematically illustrates the strain sensor according to the present invention used as a Michelson interferometer; and FIG. 6 schematically illustrates the strain sensor according to the present invention used as a Mach-Zehnder interferometer.

DESCRIPTION OF THE PREFERRED EMBODIMENT

Referring to FIG. 1, a fiber optic strain sensor 10 according to the present invention includes an optical fiber 12 that is mounted to a base plate 14. The optical fiber 12 preferably is a two-mode fiber that guides both the $LP_{01}$ and $LP_{11}$ modes. The optical fiber 12 has a portion that is formed into a coil 16, which preferably is has straight sides 17A and 17B and generally semicircular ends 18A and 18B. The coil 16 is sometimes referred to as having a racetrack shape.

The fiber optic coil 16 is attached to the base plate 14 with the straight sides 17A and 17B under a defined bias tension. The tension in the fiber may range from about the weight of a five gram mass to the weight of a 25 gram mass. In a preferred embodiment of the invention the tension in the optical fiber loop is about the weight of ten grams, or approximately 0.1 Newton. The actual tension that may be used depends upon the application and the tensile strength of the optical fiber.

FIG. 2 illustrates how the fiber optic coil 16 may be formed to have a selected tension in the straight sides 17A and 17B. First the central portion 20 of the base plate 14 is bent so that it is concave with respect to the surface where the coil 16 is to be mounted. The ends 17A and 17B of the coil 16 are then attached to the base plate 14 with a suitable adhesive such as an epoxy resin. The adhesive must retain the ends 18A and 18B of the coil 16 in position on the base plate 14.

After the adhesive cures to hold the coil 16 to the base plate 14, a top plate 22 is mounted on the coil 16 as shown in FIGS. 3 and 4. Pressure is applied to the base plate 14 and the top plate 22 to flatten the base plate 14 and stretch the straight portions 17A and 17B of the fiber coil 16. Flattening the base plate 14 applies a bias tension to the straight sides 17A and 17B of the coil 16. The top plate 22 may be attached to the ends 18A and 18B of the coil 16 using an epoxy resin.

The base plate 14, the straight portions 17A and 17B of the fiber coil 16 and the top plate 22 are sufficiently flexible along the long axis of the coil 16 so that the sensor 10 may be attached to a curved surface (not shown) where strain is to be measured. When an external strain is applied to the fiber optic coil 16 along its long axis, the straight portions 17A and 17B of the fiber coil 16 change length to either shorten or lengthen, depending upon the direction of the external strain.

Depending upon the sensitivity required, the coil 16 has about 1 to 100 turns of optical fiber. The base plate and the top plate preferably are formed of a metal about two to one hundred centimeters long, two to three centimeters wide and less than 200 $\mu$m thick.

Referring to FIG. 5, in a strain sensing system, the optical fiber 12 is arranged to receive an optical signal from an optical signal source 30. When the sensor 10 is used in an array, the optical signal source 30 preferably provides means for supplying either an input "white light" beam to the optical fiber 12. If only a single sensor is to be used, then the optical signal source 30 may be a CW laser light source. In an array of sensors the optical signal source 30 may be either a commercially available superluminescent diode (not shown) or a broadband fiber source (not shown). U.S. Pat. No. 5,142,660, issued on Aug. 25, 1992 and Ser. No. 652,534, filed Feb. 8, 1991, disclose broadband fiber sources that may be used as the optical signal source 30. The optical signal source 30 preferably has a coherence length of approximately 100-300 µm and preferably excites both the $LP_{01}$ and $LP_{11}$ modes in the optical fiber 12.

The broadband fiber source may include a glass waveguide (not shown) that has been doped with a rare-earth material that includes Er/Yb/Al. A pump light source (not shown), which may be a high power laser diode, supplies power to the glass waveguide. The optically pumped glass waveguide produces output light having wavelengths in a broad bandwidth. The pump light preferably is separated from the light by reflecting the light having the pump light wavelength back toward the input end of the waveguide and optically coupling the pump light from the waveguide.

The optical fiber 12 should be capable of propagating two modes of electromagnetic energy and preferably is an elliptical-core fiber configured to guide the $LP_{01}$ and $LP_{11}$ modes. Such fibers are well-known in the art. The core (not shown) of the optical fiber 12 has an elliptical cross-section and is surrounded by a cladding (not shown) having a refractive index lower than that of the core. The dimensions of the core are such that the $LP_{01}$ and $LP_{11}$ modes in the core totally internally reflect back into the core at the core/cladding interface.

Still referring to FIG. 5, the optical signal source 30 provides its optical output to the optical fiber 12. The fiber 12 guides the optical signal to a mode stripper 32. The mode stripper 32 eliminates the $LP_{11}$ mode from the optical fiber 12, leaving only $LP_{01}$ mode to propagate to the sensor 10. The mode stripper 32 may comprise a length of the optical fiber 12 wound around a generally cylindrical mandrel or spindle (not shown). If the diameter of the mandrel is sufficiently small, the $LP_{11}$ mode radiates into the cladding while the $LP_{01}$ mode remains guided by the optical fiber 12. The mandrel may have a diameter of about 0.64 cm, and the optical fiber 12 may be wrapped around the mandrel about fifteen times.

After passing through the mode stripper 32, the optical signal, which is only in the $LP_{01}$ mode, propagates to a fiber optic coupler 34, which may be a conventional four port fiber optic coupler. The portion of the light that remains in the optical fiber 12 after traversing the fiber optic coupler 34 then propagates to a fiber optic modal coupler 35 formed to couple part of the $LP_{01}$ mode light in the optical fiber 12 into the $LP_{11}$ mode. Preferably the modal coupler 35 couples half of the intensity that was in the $LP_{01}$ mode into the $LP_{11}$ mode. The optical fiber 12 then guides both modes to the coil 16. This basic structure of the modal coupler 34 is described by Blake, Kim & Shaw, *Fiber-optic modal coupler using periodic microbending*, Optics Letters, Vol. 11, No. 3, pp. 177-179, March 1986.

In an embodiment of the invention that uses the sensor 10 as a Michelson interferometer, the free end of the optical fiber 12 has a reflective coating 36 thereon so that both modes of the light guided by the fiber 12 reflect at the end of the optical fiber 12 and propagate back toward the modal coupler 35. The modal coupler combines part of the reflected waves so that they interfere. After passing through the mode coupler, the reflected light propagates to the coupler 34. The four port coupler 34 couples part of the combined waves into an optical fiber 38, which guides light to a detector 39. The $LP_{01}$ and $LP_{11}$ modes have different propagation velocities in the fiber 12 and therefore accumulate a phase difference as they propagate along the fiber 12. The output of the detector is an electrical signal that is indicative of the intensity of the interference pattern caused by the difference in propagation times of the two modes between the modal coupler 35 and the mirror 36.

The fiber optic sensor 10 preferably comprises a length of the single strand of elliptical core optical fiber 12. The single strand of elliptical core optical fiber 12 functions as an interferometer because it guides the $LP_{01}$ and $LP_{11}$ modes between the coupler 35 and the mirror 36 and has different propagation constants for the two modes. The two modes therefore have different velocities in the sensor fiber. The relative velocities of the two modes is dependent upon the length and refractive indices of the sensor fiber. Anything that changes either the length or the refractive indices of the sensor causes a change in the phase difference of the two modes. The interference pattern may be monitored and calibrated to provide a measurement of the strain that changed the length of the fiber.

Referring to FIG. 6, the sensor 10 may be included in a Mach-Zehnder interferometer. Light in the $LP_{01}$ mode from the mode stripper 32 propagates to a modal coupler 40 which couples half of the incident light into the $LP_{11}$ mode. The two modes then propagate through the sensor 10 and then impinge upon a modal coupler 42, which couples part of the light in the $LP_{11}$ mode into the $LP_{01}$ mode. The combined waves then interfere and form an interference pattern that may be detected with a detector 44.

When the sensor 10 is to be included in an array, the individual lengths of the sensor fibers are selected such that the difference in phase shift between any pair of all sensor elements is larger than the coherence length of the source.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic strain sensor for measuring strains along a curved surface, comprising:
    a flexible base plate;
    a length of optical fiber attached to the base plate at two spaced apart locations with a sensing portion of the optical fiber being between the two spaced apart locations, the base plate having a concave portion formed therein between the two spaced apart locations such that the base plate has a tendency to straighten itself, thereby applying a bias tension to the sensing portion of the optical fiber; and means for forming an interferometer in the sensing portion of the optical fiber.

2. The fiber optic strain sensor of claim 1 wherein a Mach-Zehnder interferometer is formed in the sensing portion of the optical fiber.

3. A fiber optic strain sensor for measuring strains along a curved surface, comprising:
   a flexible base plate;
   a length of optical fiber attached to the base plate at two spaced apart locations with a sensing portion of the optical fiber being between the two spaced apart locations;
   means for applying a bias tension to the sensing portion of the optical fiber; and
   a Michelson interferometer formed in the sensing portion of the optical fiber.

4. A method for forming a fiber optic strain sensor, comprising the steps of:
   providing a flexible base plate;
   attaching a length of optical fiber to the base plate at two spaced apart locations with a sensing portion of the optical fiber being between the two spaced apart locations;
   bending the base plate such that the base plate between the two spaced apart locations has a tendency to straighten itself, thereby applying a bias tension to the sensing portion of the optical fiber; and
   forming an interferometer in the sensing portion of the optical fiber.

5. The fiber optic strain sensor of claim 4 including the step of forming a Mach-Zehnder interferometer in the sensing portion of the optical fiber.

6. A method for forming a fiber optic strain sensor, comprising the steps of:
   providing a flexible base plate;
   attaching a length of optical fiber to the base plate at two spaced apart locations with a sensing portion of the optical fiber being between the two spaced apart locations;
   applying a bias tension to the sensing portion of the optical fiber by the steps of:
      bending a central portion of the base plate;
      fixing the optical fiber to the base plate with the two spaced apart locations being on opposite sides of the central portion; and
      straightening the base plate so that the portion of the optical fiber that is between the two spaced apart locations is under tension; and
   forming an interferometer in the sensing portion of the optical fiber.

7. A method for forming a fiber optic strain sensor including the steps of:
   providing a flexible base plate;
   attaching a length of optical fiber to the base plate at two spaced apart locations with a sensing portion of the optical fiber being between the two spaced apart locations;
   applying a bias tension to the sensing portion of the optical fiber; and
   forming a Michelson interferometer in the sensing portion of the optical fiber.

* * * * *